United States Patent [19]
Nishimura et al.

[11] Patent Number: 6,038,040
[45] Date of Patent: Mar. 14, 2000

[54] IMAGE FORMING APPARATUS WITH IMPROVED OPERABILITY

[75] Inventors: Sumiko Nishimura, Toyohashi; Eiichi Yoshida, Toyokawa; Hiroharu Tanaka, Toyokawa; Toshiyuki Yamashita, Toyokawa; Takatsugu Kuno, Aichi-ken, all of Japan

[73] Assignee: Minolta Co., Ltd., Osaka, Japan

[21] Appl. No.: 08/947,335

[22] Filed: Oct. 8, 1997

[30] Foreign Application Priority Data

Mar. 12, 1997 [JP] Japan .................................. 9-057882

[51] Int. Cl.$^7$ ...................................... H04N 1/32
[52] U.S. Cl. ............................ 358/468; 358/474
[58] Field of Search ..................... 358/400, 401, 358/404, 444, 468, 437, 434, 474

[56] References Cited

U.S. PATENT DOCUMENTS

| | | | |
|---|---|---|---|
| 5,206,735 | 4/1993 | Gauronski et al. | 358/396 |
| 5,239,388 | 8/1993 | Matsumoto | 358/448 |
| 5,832,331 | 11/1998 | Yoshida | 358/401 |

FOREIGN PATENT DOCUMENTS

| | | | |
|---|---|---|---|
| 4-21188 | 4/1992 | Japan | G03G 15/01 |

*Primary Examiner*—Jerome Grant, II
*Attorney, Agent, or Firm*—McDermott, Will & Emery

[57] ABSTRACT

An image forming apparatus stores a plurality of jobs. When a process for a job is temporarily stopped due to any trouble of the apparatus or interruption, the job is not automatically resumed if an image reader and a printer operate for the same job. If the image reader and the printer operate for different jobs, only the printing operation is automatically resumed. In this case, the reading operation of the image reader is not automatically resumed.

11 Claims, 9 Drawing Sheets

IMAGE FORMING APPARATUS WITH IMPROVED OPERABILITY

BACKGROUND OF THE INVENTION

1. Field of the Invention

The present invention relates to image forming apparatuses, and more particularly, relates to an image forming apparatus which can carry out an image reading operation for image data in parallel with an image forming operation for image data.

2. Description of the Related Art

An image forming apparatus having a so-called multi-job function has been known. The multi-job function allows the image reading operation for image data of a first group of original documents to be synchronously carried out in parallel with the image forming operation for image data of a second group of original documents which is different from the first group of originals. Such an image forming apparatus is structured such that the image reading and image forming operation being executed is discontinued by, for example, warning of the paper empty, jam and the like, malfunction of the apparatus itself, an interruption which makes an image forming operation to be executed by interrupting a job (image forming operation for one group of original documents) being executed, and the like.

Regarding such an image forming apparatus, U.S. Pat. No. 5,239,388 discloses the following image forming apparatus. In this image forming apparatus, image forming operation for a job being executed is discontinued when some malfunction occurs, determination is made as to whether the malfunction belongs to an automatic recovery category or to a manual operation recovery category, and control is made such that the discontinued image forming operation is automatically resumed when a factor of the malfunction is removed if the malfunction belongs to the automatic recovery category, and the image forming operation is not resumed until a proper manual operation is carried out even if a factor of the malfunction is removed when the malfunction belongs to the manual recovery category.

In the case of the image forming apparatus having the multi-job function, when a malfunction belonging to the manual recovery category as described above occurs, even if a factor of the malfunction is removed, a user who has registered the image forming operation to be resumed at this time is not always present near the apparatus. The user who has registered the image forming operation to be resumed is supposed to have registered the operation in advance by an image reading operation and the like.

Accordingly, sometimes the user carries out no proper manual operation for resuming the image forming operation, and the image forming operation is left discontinued for a long time.

Then, when the image forming operation is discontinued due to any warning, malfunction, interruption and the like in the image forming apparatus, in some cases the image forming operation needs to be resumed automatically at the time of removal of the factor of the discontinuation.

Japanese Patent Laying-Open No. 4-2188 discloses an image forming apparatus in which, when the interruption above is set, the interruption is automatically canceled if no operation is carried out for a definite time, and an image reading operation and an image forming operation that are discontinued due to setting of the interrupt operation are automatically carried out.

As for a general image forming apparatus, a user brings some original documents to be set for an image reading operation, executes an operation for starting, and takes away the original documents when the image reading operation completes. In other words, the user attends the image reading operation in most cases.

In this case, if the operation is discontinued due to any warning, malfunction, interruption and the like, especially if the operation is discontinued due to jam of the original documents being read, the user may handle the set documents while the operation is discontinued.

If an image forming apparatus is structured such that the image reading operation is automatically resumed when a factor of discontinuation is removed, the user attending the image reading operation may feel uneasy in the case described above.

In some cases, when the image reading operation is discontinued due to any warning, malfunction, interruption and the like in the image forming apparatus, the automatic resuming of the operation may be less convenient for the user.

SUMMARY OF THE INVENTION

The present invention is made considering the conditions described above. One object of the invention is to provide an image forming apparatus which resumes an operation which has been discontinued in a manner convenient for a user.

In order to achieve the object above, an image forming apparatus according to an aspect of the invention includes an image reading unit which reads an image of a first group of original documents to produce image data, an image forming unit which forms an image based on image data of a second group of original documents, and a control unit which stops operations of the image reading unit and the image forming unit when a prescribed factor arises. The control unit controls such that the operation of the image forming unit is automatically resumed while the operation of the image reading unit is kept stopped and a manual input for resuming is accepted when the prescribed factor is removed if the first group of original documents differs from the second group of original documents.

According to another aspect of the invention, an image forming apparatus includes an image reading unit which reads an image of an original document and produces image data, a memory which stores image data output from the image reading unit, an image forming unit which forms an image based on image data stored in the memory, a detection unit which detects if a prescribed factor arises, and a control unit which stops operations of the image reading unit and the image forming unit when the detection unit detects that a prescribed factor arises. The control unit controls such that the operation of the image forming unit is automatically resumed and a manual input for resuming the operation of the image reading unit is accepted when the prescribed factor is removed if the image reading unit and the image forming unit operate for different groups of original documents.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One example of an embodiment of the present invention is described below referring to attached figures.

Figure 1:
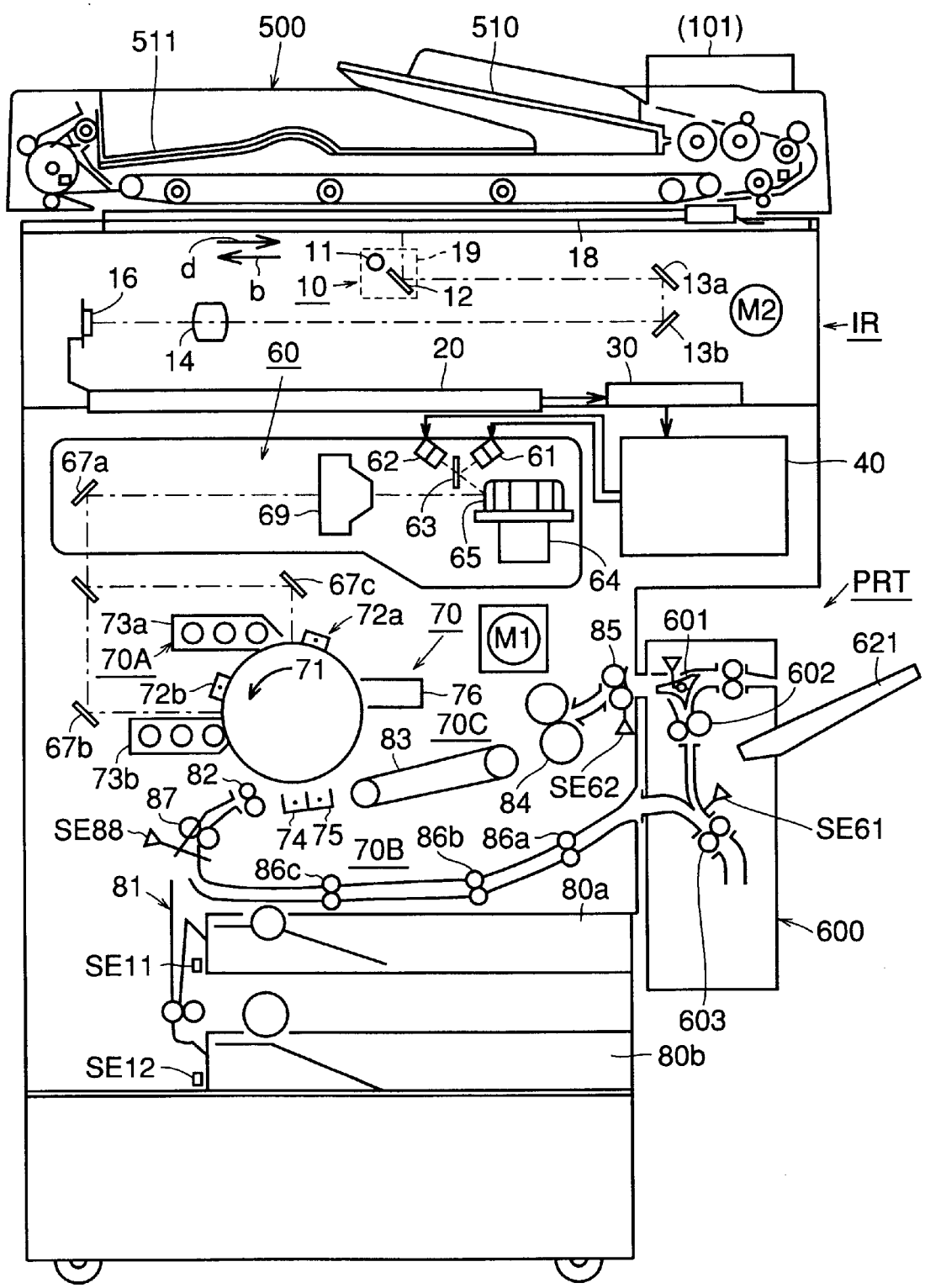
FIG. 1 is a cross sectional view illustrating an entire structure of a copying machine as one example of an image forming apparatus according to the present invention.

FIG. 1 is a cross sectional view showing an entire structure of a copying machine 1 as one example of an image forming apparatus according to the present invention.

Referring to FIG. 1, copying machine 1 includes: a scan system 10 which reads an original and converts it to an image signal; an image signal processing unit 20 which processes the image signal supplied from scan system 10; an image memory 30 which stores image data input from image signal processing unit 20; a print processing unit 40 which drives semiconductor lasers 61 and 62 based on the image data supplied from image memory 30; an optical system 60 which combines two laser beams from semiconductor lasers 61 and 62 and directs it to a prescribed exposure position on a photoreceptor drum 71; an image forming system 70 which develops a latent image formed by exposure, transfers it onto a sheet and fixes it to form an image; an operation panel 101 provided at an upper surface of a main body (which is placed at an upper surface of copying machine 1 (in a direction vertical to the plane of the paper)); an original transport unit 500 which transports an original and reverses it if necessary; and re-feed unit 600 for supplying a sheet to a transfer position again.

An image reader IR is constituted by scan system 10, image signal processing unit 20 and the like, and a printer PRT is constituted by print processing unit 40, optical system 60, image forming system 70 and the like.

Scan system 10 is constituted by an exposure lamp 11 and a first mirror 12 attached to a scanner 19 which moves below a platen glass 18, mirrors 13a and 13b which move in the same direction as scanner 19 at a half speed of scanner 19, a collective lens 14, a photoelectric conversion element 16 using a CCD array or the like, a scan motor M2 and the like.

Photoelectric conversion element 16 converts an image of a non-specified color mainly of black and an image of a specified color (red) in an original respectively to electric signals.

Image signal processing unit 20 processes an image signal output from photoelectric conversion element 16 and outputs image data to image memory 30.

Print processing unit 40 receives the image data and supplies it to semiconductor lasers 61 and 62 depending on the image data transmitted. Optical system 60 is constituted by semiconductor lasers 61 and 62, a dichroic mirror 63 which combines two laser beams from semiconductor lasers 61 and 62, a polygon mirror 65 which polarizes the combined laser beam, a motor 64 which rotates polygon mirror 65, a main lens 69, reflection mirrors 67a, 67b, 67c and the like.

Image forming system 70 is constituted by a development transfer system 70A, a transport system 70B, and a fixing system 70C.

Development transfer system 70A is constituted by a photoreceptor drum 71 which is driven to rotate in a counterclockwise direction in FIG. 1, a first corona charger 72a, a first developing unit 73a, a second corona charger 72b, a second developing unit 73b, a transfer charger 74, a separation charger 75, a cleaning unit 76 and the like. Components except for photoreceptor drum 71 are placed around photoreceptor drum 71 in order from the upstream side of the direction of rotation. The first developing unit 73a contains a two-component developer formed of a toner and a carrier.

Transport system 70B is constituted by cassettes 80a and 80b for holding sheets, size detection sensors SE11 and SE12 which detect the size of the sheet, a sheet guide 81, a timing roller 82, a transport belt 83, horizontal transport rollers 86a–86c which transport sheets supplied from re-feed unit 600, and the like.

Fixing system 70C is constituted by a fixing roller 84 which transports a toner image on a sheet while fixing it by heat and pressure, a discharge roller 85, a discharge sensor SE62 which detects discharging of sheets and the like.

Re-feed unit 600 is of circulation type which temporarily holds a sheet discharged from discharge roller 85, and transports it to horizontal transport roller 86a in transport system 70B for forming an image (printing) again. The sheet is reversed in duplex mode, and not reversed in composite mode by re-feed unit 600. Re-feed unit 600 is constituted by a switching claw 601 for switching from discharging to a discharge tray 621, to re-feeding and by versa, a transport roller 620, a reverse roller 603, a reverse sensor SE61 and the like.

In the duplex mode, the left edge portion of switching claw 601 is moved upward by a solenoid (not shown). Accordingly, a sheet discharged from discharge roller 85 is directed to transport roller 602 and to reverse roller 603.

When the trailing edge of the sheet reaches reverse sensor SE61, reverse roller 603 reverses to allow the sheet to be transported toward horizontal transport roller 86a. The sheet travels through horizontal transport rollers 86b and 86c and an intervening roller 87, arrives at timing roller 82 and waits there.

At this time, the next sheets follow successively with a prescribed interval. The number of sheets each having a print on one side that can wait at a copy path including transport rollers 602 and 603 and horizontal transport rollers 86a–86c depends on the length of the sheet and the length of the copy path if there is no delay of image data. In this embodiment, the maximum number of sheets that can wait there is three. In front of intervening roller 87, sensor SE88 which detects the leading edge of a transported sheet is provided. original transport unit 500 automatically transports an original placed on an original feed tray 510 onto platen glass 18 and discharges it to an original discharge unit 511 after the surface (lower surface) of the original is read by scanner 19.

The data read in image reader IR is input to image memory unit 30 and stored therein.

In copying machine 1, the speed of movement of scanner 19 in the direction of arrow b is higher than that in the direction of an arrow d. Scanning of an image by photoelectric conversion element 16 when scanner 19 moves in the direction of b is referred to as a preliminary scanning. At this time, the size and position of an original on the platen glass are detected based on the image data output from photoelectric conversion element 16. Scanning of an image by photoelectric conversion element 16 when scanner 19 moves in the direction of d is referred to as a main scanning, in which reading of image data of an original is carried out based on image data output from photoelectric conversion element 16.

Copying machine 1 is further provided with a sensor for detecting the open/close state of original transport unit 500. Using this sensor, whether original transport unit 500 provided to be able to open/close to printer PRT is opened or closed can be detected. This sensor is used for determining if a user is to change an original or a user has left an original to be copied.

A surface (original cover) of original transport unit 500 opposite to platen glass 18 is colored orange. The light from exposure lamp 11 which is reflected from the original cover has thus a color of low spectral sensitivity for photoelectric conversion element 16. This corresponds to a case in which the original cover is colored black. Since the surface of an original is usually white, photoelectric conversion element 16 can identify the original and the lower surface of the original cover when the original cover is closed. Further, if the original cover is not closed, the light emitted from exposure lamp 11 does not reach photoelectric conversion element 16, so that the region of the original can be identified.

Figure 2:
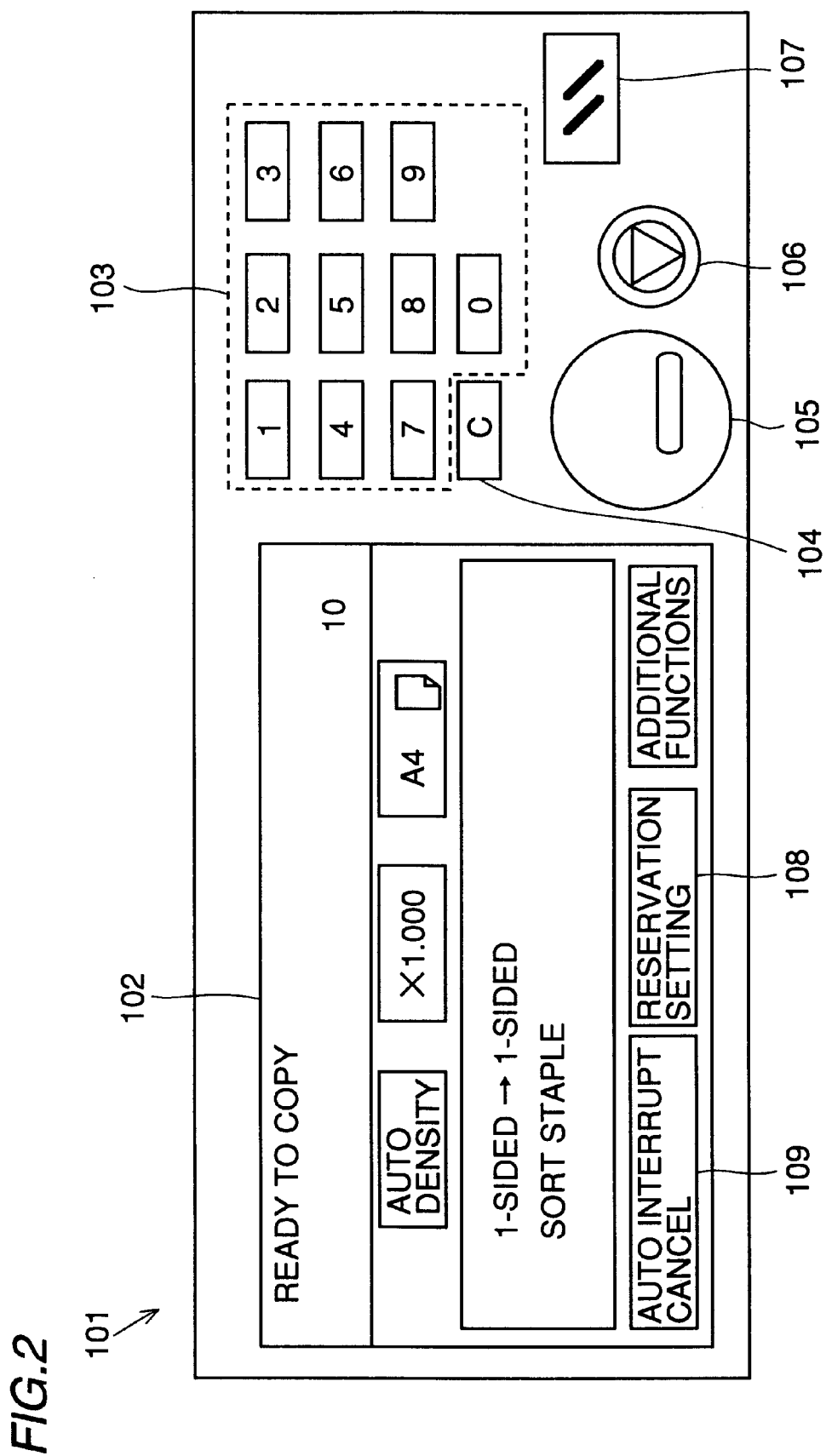
FIG. 2 shows an operation panel provided for the copying machine in FIG. 1.

FIG. 2 shows an operation panel 101 provided for copying machine 1 in FIG. 1. Operation panel 101 includes: a touch panel 102 constituted by LCD by which various pictures and messages are displayed thereon; a ten key 103 for input of some numbers such as the number of copies to be made and the zoom ratio; a clear key 104 for reset of the number of copies input by ten key 103 to "1", and for clearing the input zoom ratio; a start key 105 for starting printing operation; a stop key 106 for stopping a continuous printing operation; and a panel reset key 107 for clearing all of the copying conditions set by pressing the keys and for resetting to the initial state.

A reservation setting key 108 and an automatic interrupt cancel key 109 are displayed on touch panel 102. By pressing reservation setting key 108, setting of a job for reservation can be made in copying machine 1. The setting of a job for reservation is made, when printing operation for a certain image data recorded in image memory 30 is carried out in optical system 60 and image forming system 70 of copying machine 1, for setting a condition for printing operation for another image data of a job for which a printing operation is thereafter carried out.

By pressing automatic interrupt cancel key 109, the copying machine can be set to automatically cancel setting of an interrupt operation when no operation is executed for a definite time during the interrupt operation. In copying machine 1, image formation is successively carried out by printer PRT for a plurality of groups of originals (jobs) stored in image memory 30 as described below. By the interrupt operation, jobs successively carried out are interrupted by a new job at a certain time and image formation for the new job is executed.

Figure 3:
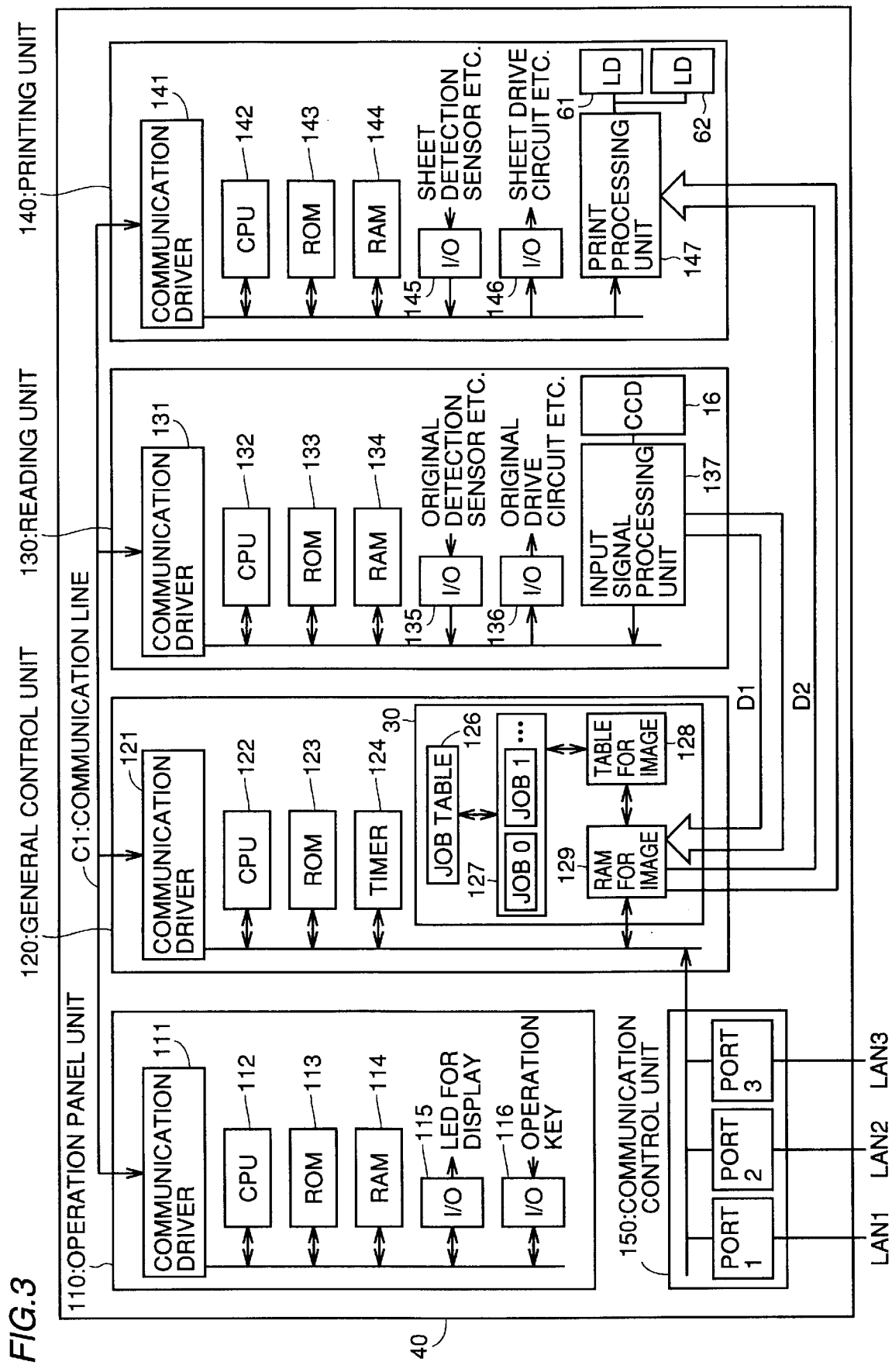
FIG. 3 is a block diagram showing a structure of a print processing unit of the copying machine in FIG. 1.

FIG. 3 is a block diagram showing a structure of print processing unit 40 of copying machine 1.

Print processing unit 40 is constituted by an operation panel unit 110, a general control unit 120, a reading unit 130, a printing unit 140, and a communication control unit 150. Those units are connected such that they communicate with each other serially via communication drivers 111, 121, 131, and 141 and a communication cable C1 and transmit and receive command or status. Those units respectively include CPU 112, 122, 132 and 142, ROMs 113, 123, 133 and 143 in which respective programs are stored, and RAMs 114, 30, 134 and 144 as work areas for executing the programs. General control unit 120 is provided with a timer 124 which counts the time of one routine of a main routine.

Operation panel unit 110 is a block for controlling operation panel 101. Details set by various operation keys on operation panel 101 or touch panel 102 are read, and the result of the setting or operational state of the copying machine is displayed on LED or LCD. Information about the key input by a user, or on the touch panel is transmitted as a condition for forming an image through communication cable C1 to general control unit 120.

Reading unit 130 controls scan system 10 and original transport unit 500 described above. Reading unit 130 detects the state of feeding and transporting of an original or whether an original is set at original transport unit 500 through an input/output circuit (I/O) 135, and controls a circuit for driving an original and a circuit for driving a mirror for scanning of an original through an input/output circuit 136. Image data read by photoelectric conversion element (CCD) 16 is transmitted to image memory unit 30 via an input signal processing unit 137.

Printing unit 140 controls the printer (PRT). Printing unit 140 detects the size of a sheet or the transporting state of the sheet through an input/output circuit 145, and controls a drive circuit for a sheet through I/O 146. Printing unit 140 further drives semiconductor lasers (LD) 61 and 62 according to data transmitted to print processing unit 147. Accordingly, printer PRT is controlled by printing unit 140 to enable processes such as feeding of a sheet, developing, transferring, and fixing in copying machine 1, and an image is formed on a desired sheet.

General control unit 120 controls copying machine 1 entirely. General control unit 120 manages an image read by image reader IR, and further manages image data transmitted from external units (units on LAN 1–3) connected to copying machine 1 via communication control unit 150. RAM 30 of general control unit 120 is provided with an RAM 129 for image, for storing images of originals from several hundreds to several thousands read by image reader IR. Image data transmitted through input signal processing unit 137 bus D1 of reading unit 130, or image data transmitted from communication control unit 150 is stored in RAM 129 for image in RAM (image memory) 30.

As shown in FIG. 3, copying machine 1 is connected to three LANs (LAN 1–3) via communication control unit 150, and image formation (print) is possible according to image data transmitted from respective personal computers on LANs 1–3.

RAM (image memory) 30 includes a job table 126, a job stack 127, a table for image 128, and an RAM for image 129.

In copying machine 1, image data read by image reader IR as well as image data transmitted from communication control unit 150 can be stored in RAM for image 129. Copying machine 1 is structured such that a plurality of sheets can be printed by reading data once, and transmitting data from RAM for image 129 a plurality of times, when a plurality of prints are to be made for one image. Further, RAM for image 129 has a capacity large enough to collectively store image data for a large number of originals, so that the order in which images are read can be changed for printing.

Procedure of the print operation is stored in RAM (image memory) 30 in copying machine 1. When image data read by image reader IR and that transmitted from communication control unit 150 are printed, the printing is controlled referring to the table and the like stored in RAM (image memory) 30.

General control unit 120 sends its command to operation panel unit 110, reading unit 130 and printing unit 140, and carries out the whole reading operation and printing operation. Process of these operations is similar to the control in a conventional digital copying machine, and the description thereof is omitted.

Figure 4:
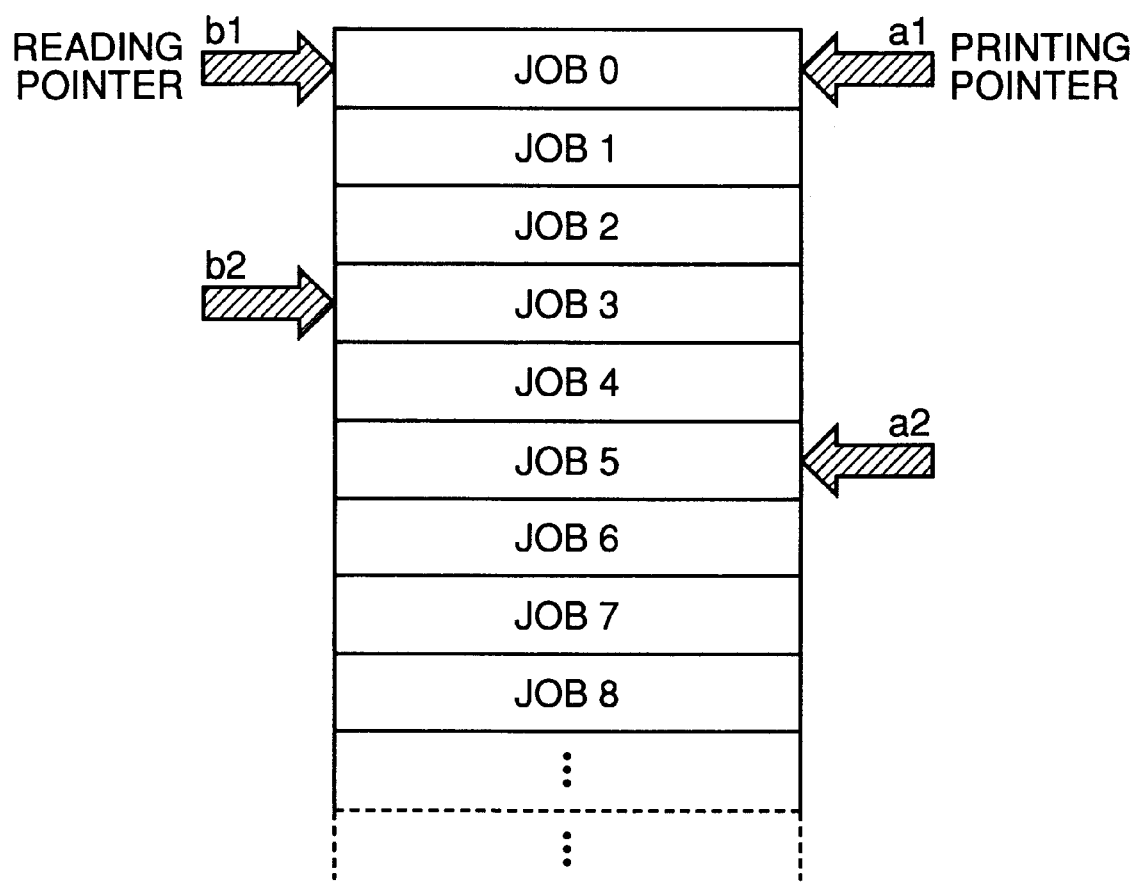
FIG. 4 shows a structure of a job stack in FIG. 3.

FIG. 4 shows a structure of a job stack 127. A plurality of jobs (job0, job1, job2, job3, . . . ) are stored in job stack 127. A print job pointer a and a reading job pointer b respectively indicate jobs being executed.

FIG. 4 shows two combinations of pointers (a1, b1) and (a2, b2). In the case of (a1, b1), both pointers a and b indicate job0. This means that image reading by image reader IR and image formation by printer PRT are carried out for the same job, that is, image data is read and immediately image formation is executed for the data as in the normal copy operation.

In the case of (a2, b2), pointer a indicates job5 while pointer b indicates job 3. This means that image formation by printer PRT and image reading by image reader IR are carried out in parallel for different jobs.

Figure 5:
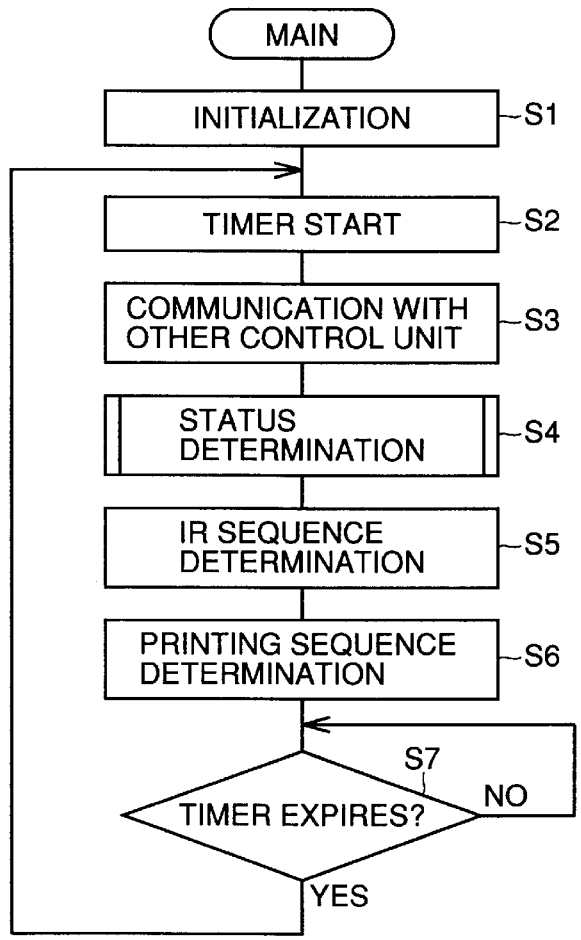
FIG. 5 shows a main routine of a CPU 122 of a general control unit in FIG. 3.

FIG. 5 shows a main routine of a CPU 122 in general control unit 120 in FIG. 3.

With reference to FIG. 5, initialization process of a mode in copying machine 1 is carried out in step S1 ("step" is hereinafter omitted) by turning on the power supply of copying machine 1.

Next in S2, a routine timer which has been set in advance for making the length of one period of the main routine constant is started.

In S3, communication process with other CPUs in FIG. 3 is executed.

Next in S4, the status determination process described below is carried out.

In S5, a process for determining an operation of image reader IR is carried out.

In S6, a process for determining an operation of printer PRT is carried out.

In S7, determination is made as to whether the timer started in S2 expires or not. If the timer expires, one routine is completed and the processing returns to S2. Utilizing the length of time of one routine, counting of various timers in the subroutine described below is carried out. Values of various timers described below are constituted such that completion of a timer is determined by deciding how many times the main routine is repeated.

Figure 6:
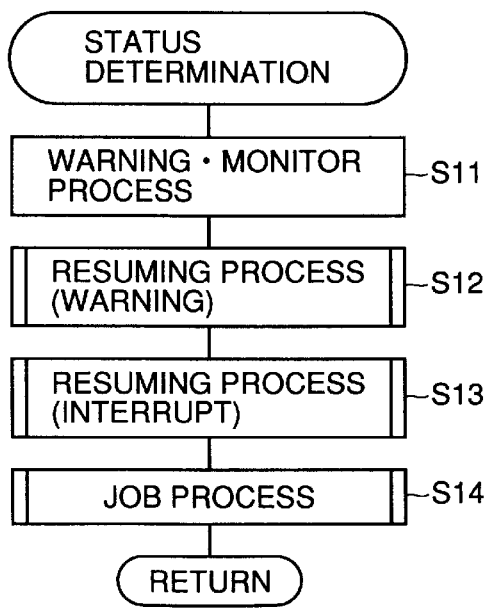
FIG. 6 shows a subroutine of the status determination process in FIG. 5.

FIG. 6 shows a subroutine of a process for determining a status in S4 of FIG. 5.

With reference to FIG. 6, processes carried out in S11 are as follows. When a job being executed is to be discontinued due to any malfunction of copying machine 1, paper empty, start of interrupt operation, and the like, warning message or the like is displayed on operation panel 101. In addition, whether such a state occurs or not is monitored. Thereafter, S12 is executed.

In S12, resuming process (warning) of a job which is discontinued in order to display any warning message of malfunction, paper empty and the like is carried out as described below, and S13 is carried out.

In S13, resuming process (interruption) of a job which is discontinued for starting the interrupt operation is carried out as described below, and S14 is executed.

In S14, a job process after the image forming operation is automatically resumed is carried out as described below, and the process returns to the status determination process.

Figure 7:
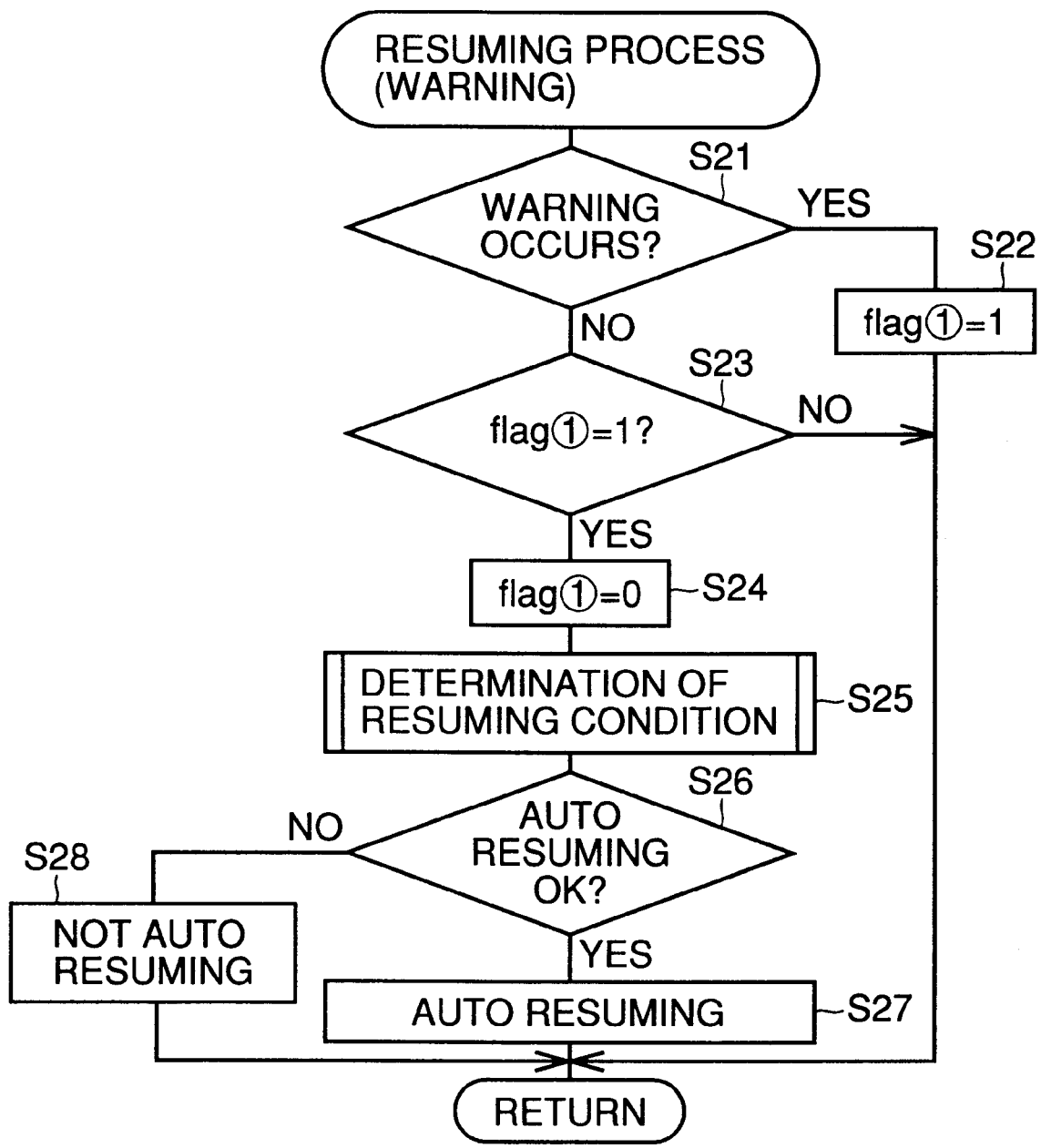
FIG. 7 shows a subroutine of the resuming process (warning) in FIG. 6.

FIG. 7 shows a subroutine of the resuming process (warning) in S12 of FIG. 6.

With reference to FIG. 7, in S21, determination is made as to whether any state requiring display of any warning message such as malfunction of the apparatus, paper empty, and the like (warning state) occurs in copying machine 1 or not. If some warning state occurs, S22 is executed in which a flag indicating occurrence of the warning is set for displaying a warning message or the like (flag ①=1), and the process returns to the main routine. If no warning state occurs (the warning state is canceled), S23 is executed.

In S23, determination is made as to whether a flag indicating that the warning state occurs is set or not (flag ①=1). If the flag is not set, the process returns to the main routine. If the flag is set, the flag is reset (flag ①=1) in S24, and S25 is next executed.

In S25, a process of determining whether the operation discontinued in copying machine 1 can be automatically resumed or not is carried out as described below. In S26, the result of the process in S25 is determined, that is, whether the automatic resuming is possible or not is determined. If automatic resuming is possible, automatic resuming process is carried out in S27. If the automatic resuming is impossible, the discontinued operation is not automatically resumed until a proper manual operation is carried out. After the operation is resumed, the process returns to the main routine.

Figure 8:
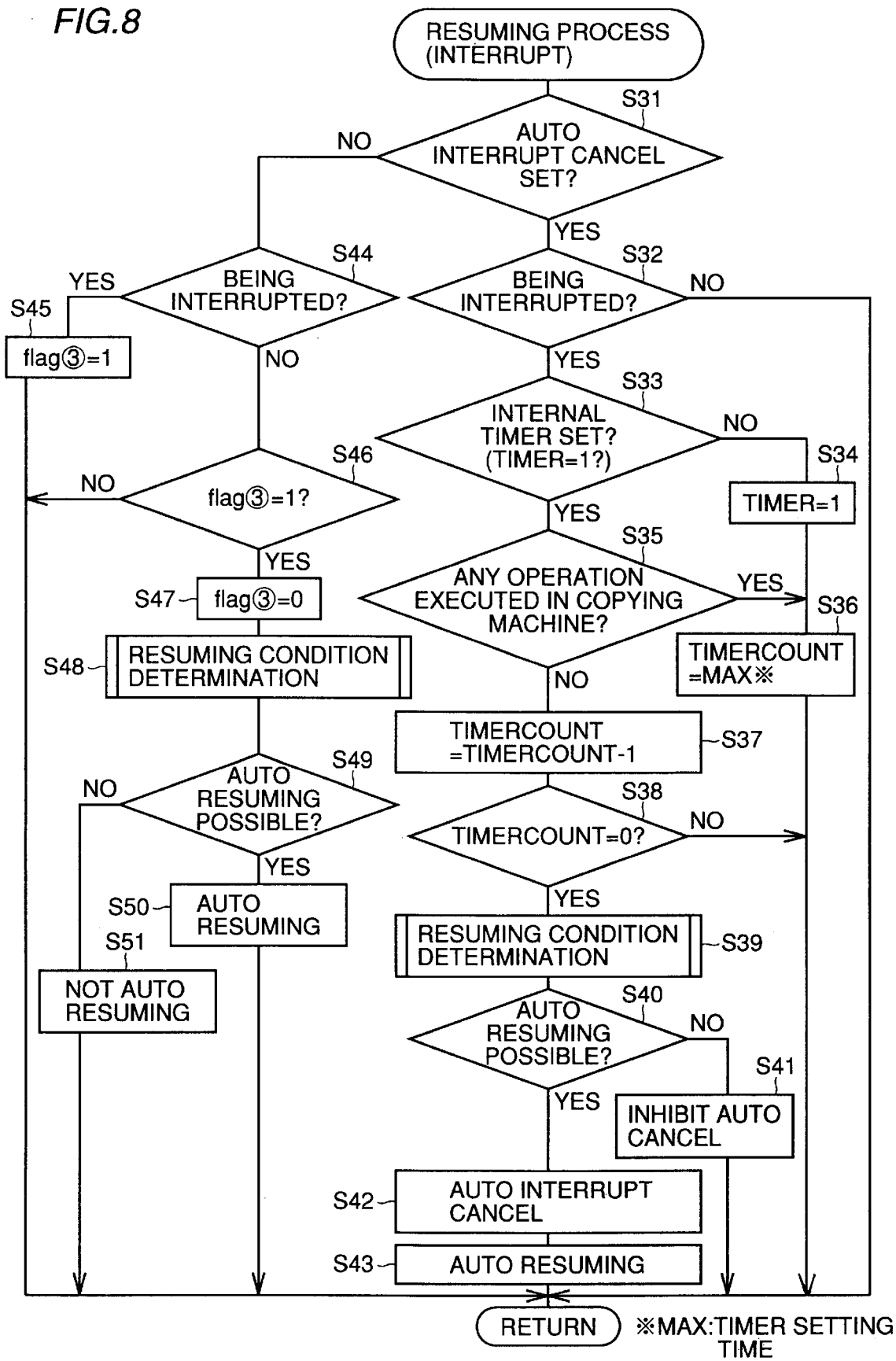
FIG. 8 shows a subroutine of the resuming process (interruption) in FIG. 6.

FIG. 8 shows a subroutine of the resuming process (interruption) of a job discontinued due to start of the interrupt operation in S13 of FIG. 6.

Referring to FIG. 8, first in S31 determination is made as to automatic interrupt cancellation is set in copying machine 1 or not. Automatic interrupt cancellation is set by automatic interrupt cancellation key 109 on operation panel 101 described above. If the automatic interrupt cancellation is set, S32 is executed. If the cancellation is not set, S44 is executed.

In S32, whether the interrupt operation currently proceeds in copying machine 1 or not is determined. If the interrupt operation does not proceed, the process returns to the main routine. If the interrupt operation proceeds, whether the internal timer is set or not is determined in S33. If the internal timer is not set, an internal timer flag is set (TIMER=1) in S34, a timer counter is set to a prescribed value (TIMERCOUNTER=MAX where MAX indicates setting time of a timer) in S36, and the process returns to the main routine. If the internal timer is set, S35 is carried out, and determination is made as to whether or not any operation is executed in copying machine 1 such as key operation on operation panel 101. If any operation is carried out, S36 is executed to set the timer to a preset time (MAX) again, and the process returns. If no operation is executed, S37 is carried out.

In S37, the value of the timer counter is decreased by "1", and in S38, whether the value of the timer counter becomes "0" or not is determined. If the value of the timer counter is not "0", the process returns to the main routine. If the timer counter value is "0", S39 is carried out to determine whether the operation discontinued in copying machine can be automatically resumed or not, that is, resuming condition determination process is carried out and S40 is executed.

In S40, whether the result of the resuming condition determination process in S39 shows that automatic resuming is possible or not is determined. If the automatic resuming is impossible, automatic cancellation of interrupt state is inhibited, that is, the state of interruption is maintained in the apparatus, and the process returns to the main routine. If the automatic resuming is possible, in S42, a process for automatically canceling the interrupt state is carried out. Further in S43, the discontinued job is automatically resumed, and the process returns.

In S44, determination is made as to whether the interrupt operation proceeds in the apparatus or not. If the interrupt operation proceeds in the apparatus, an interrupt flag is set (flag ③=1), and the process returns the main routine. If the interrupt operation does not proceed, in S46, whether the interrupt flag is set or not is determined. If the flag is not set, the process returns to the main routine. If the flag is set, in S47, the interrupt flag is canceled (flag ③=0), and the process proceeds to S48.

In S48, the resuming condition determination process similar to that in S39 is carried out. In S49, whether the result of the process shows that automatic resuming is possible or not is determined. If the automatic resuming is possible, in S50, the discontinued job is automatically resumed. If the automatic resuming is impossible, in S51, the discontinued job is not resumed until any proper manual operation is carried out, and the process returns to the main routine.

Figure 9:
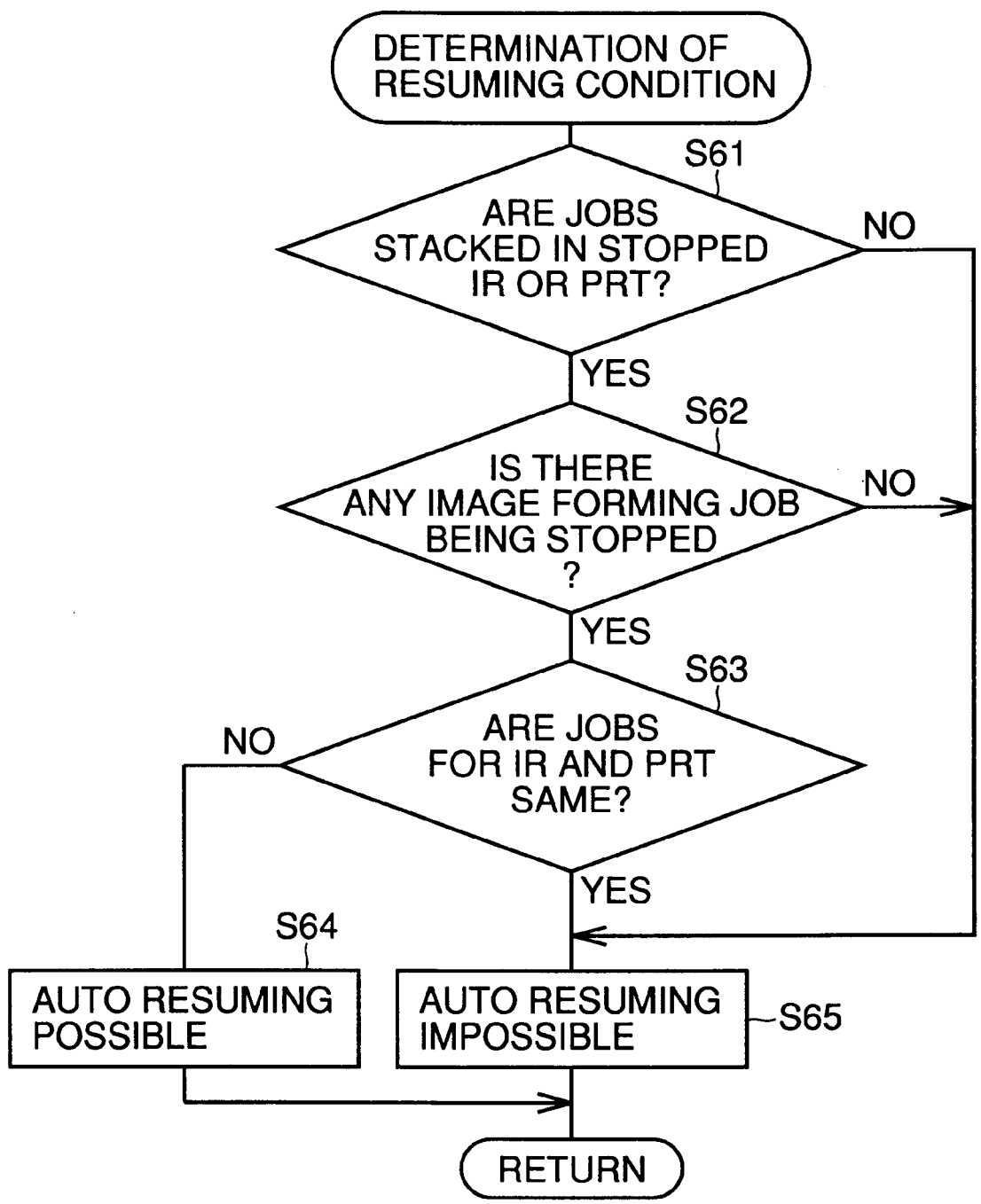
FIG. 9 shows a subroutine of the resuming condition determination process in FIGS. 7 and 8.

FIG. 9 shows a subroutine of the resuming condition determination process executed in S39 and S48 in FIG. 8. In copying machine 1, image reading operation in image reader IR and image forming operation in printer PRT are discontinued when any warning state or interruption occurs as described above. In this embodiment, the apparatus is structured such that only image forming operation can be automatically resumed when image reading operation and image forming operation are discontinued. The reason why the apparatuses is structured such that image reading operation cannot be automatically resumed is as follows. In the case of the general copying machine, a user attends image reading operation. User may feel uneasy if image reading operating is suddenly resumed when resuming of the operation becomes possible. Further, when resuming of the operation is possible, a user can carry out a proper manual operation for resuming even if the operation is not automatically resumed.

Figure 10:
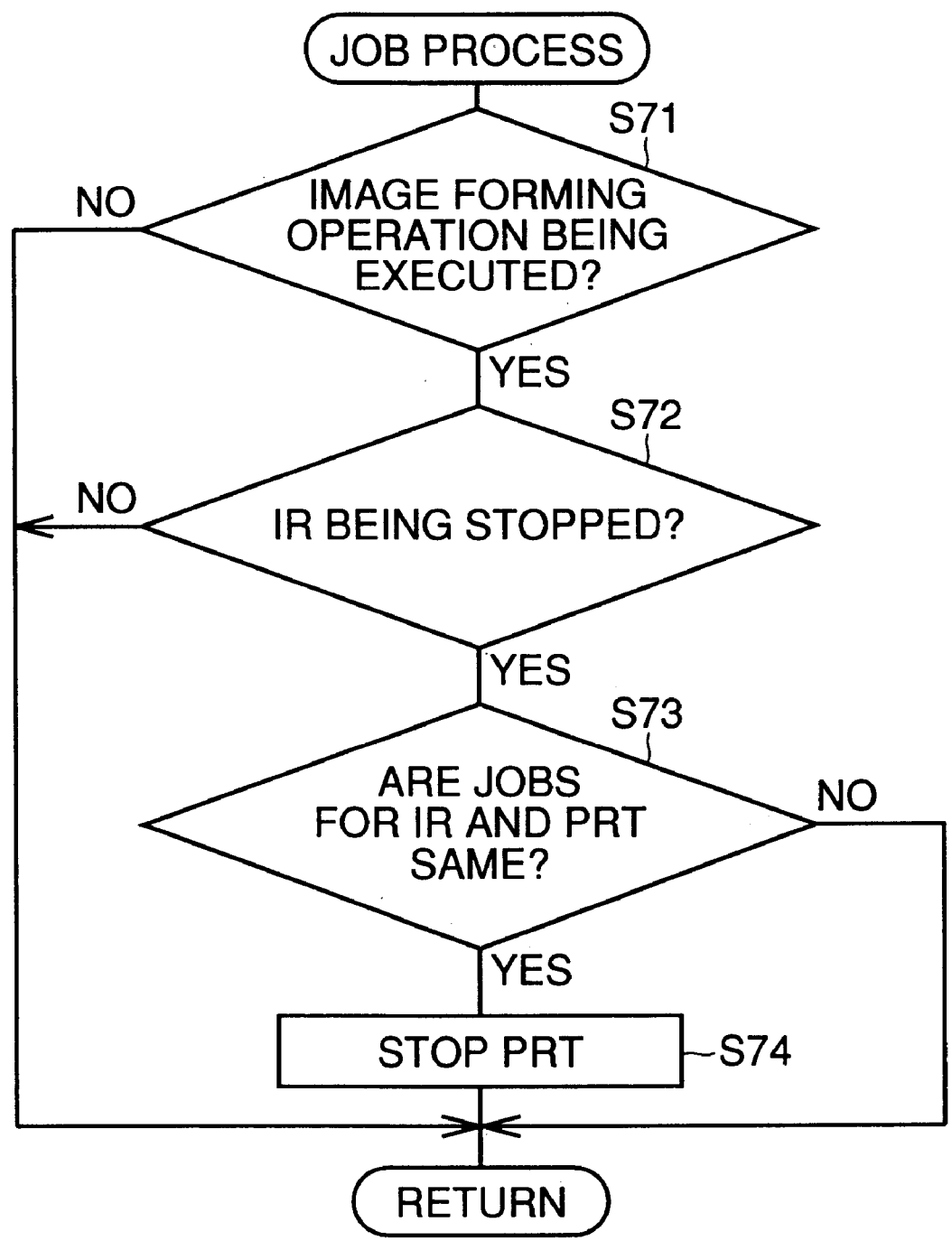
FIG. 10 shows a subroutine of the job process in FIG. 6.

Accordingly, the resuming condition determination process in FIG. 10 is a process for determining whether image forming operation can be automatically resumed or not.

With reference to FIG. 9, in S61, whether image reading operation or image forming operation is discontinued when a job is executed by interrupting the execution of the job is determined. In other words, determination is made as to whether jobs are stacked in the discontinued image reader IR or printer PRT. If either of the discontinued operation, is stopped executing a job, that is, any jobs are stacked in either of image reader of printer, S62 is carried out. If not, that is, a job to be executed is not present in copying machine 1, the job interrupted in S65 cannot be automatically resumed, and the process returns to the main routine.

In S62, if any of the jobs stacked in S61 requires image formation in printer PRT or not, that is, if image forming operation is discontinued in copying machine 1 or not is determined. If not, only image reading operation is currently discontinued. In this case, it is determined that automatic resuming impossible in S65, and the process returns to the main routine. If the image forming operation is discontinued, S63 is carried out.

In S63, determination is made as to the discontinued image reading operation and the image forming operation are carried out for the same job or not, by referring to job stack 127 in FIG. 4. If those operations are not for the same job, in S64, automatic resuming of the image forming operation is determined to be possible, and the process returns to the main routine. If those operations are for the same job, in S65, automatic resuming of image forming operation is determined to be impossible, and the process returns to the main routine.

The reason why the automatic resuming of the image forming operation is made impossible (S65 is carried out) when the operations are carried out for the same job in S63 is as follows. Even if image reading operation and image forming operation are carried out for the same job, the image reading operation is not automatically resumed. As a result, a user needs to manually operate for resuming this image reading operation. At this time, the user may carry out a manual operation for resuming the discontinued image forming operation.

According to the embodiment described above, an image forming apparatus is constituted by copying machine 1 in which an operation is discontinued when a prescribed factor arises.

An image reading unit is constituted by image reader IR in which image data of a first group of original documents is read.

An image forming unit is constituted by printer PRT in which, in parallel with reading of image data of the first group of original documents in the image reading unit, image forming is carried out for a second group of original documents which is different from the first one.

Copying machine 1 is controlled such that an image forming operation which has been discontinued due to any warning state or interruption is automatically resumed if the discontinued image reading operation and image forming operation have not been carried out for the same job, and the discontinued image forming operation is not automatically resumed if the discontinued image reading and forming operations have been carried out for the same job.

In order to constitute copying machine 1 as described above, image forming operation should be stopped when the image forming operation is to be executed for a job which is the same as the discontinued job of image reading operation which is left discontinued, when the image forming operation is automatically resumed and jobs stored in image memory 30 are successively executed.

A process for stopping the image forming operation in this case is referred to as a job process.

FIG. 10 shows a subroutine of the job process in S14 of FIG. 6.

Referring to FIG. 10, in S71, determination is made as to whether image forming operation is carried out in printer PRT or not. If the image forming operation is not carried out, the process returns to the main routine. If the operation is carried out, S72 is executed.

In S72, determination is made as to whether the image reading operation in image reader IR is stopped or not. If the image reading operation is not stopped, that is, image reading operation proceeds, the process returns to the main routine. When the image reading operation is stopped, the process proceeds to S73.

In S73, whether the stopped image reading operation and image forming operation are executed for the same job or not is determined. If those operations are carried out for different jobs, the process returns to the main routine. If those operations are carried out for the same job, image forming operation is stopped in S74, and the process returns to the main routine.

As heretofore described, copying machine 1 is controlled such that image forming operation which is discontinued due to any warning state or interruption is automatically resumed after a factor of the discontinuation is removed if the discontinued image reading operation and image forming operation have not been executed for the same job, and the discontinued image forming operation is not automatically resumed if the discontinued image reading and image forming operations have been executed for the same job. Since copying machine is controlled in such a manner as described above, the image forming operation is never left discontinued. Further, the discontinued image reading operation is never suddenly resumed to make a user uneasy. In addition, the discontinued operation is resumed in a manner which is convenient for a user to operate the apparatus. The apparatus is controlled such that image forming operation is never automatically resumed when image reading and image forming operations have been carried out for the same job. Therefore, when image reading operation often attended by a user is not automatically resumed, image forming operation for a group of original documents which is the same as that of image reading operation is not automatically resumed, so that the user never feels uneasy.

The apparatus may be structured such that image forming operation is automatically resumed in any case if a factor of discontinuation is removed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
    an image reading unit which performs an image reading operation that comprises either reading first images of a first group of original documents and producing first image data corresponding thereto, or reading second images of a second group of original documents and producing second image data corresponding thereto;
    an image forming unit which performs an image forming operation that comprises either reproducing said first images based on said first image data, or reproducing said second images based on said second image data and
    a control unit which stops the image reading operation of said image reading unit and stops the image forming operation of said image forming unit when a prescribed factor arises, wherein
    if the image reading operation and the image forming operation are performed on a different group of original documents, then said control unit automatically resumes the image forming operation, maintains the image reading operation in the stopped condition and accepts a manual input for resuming the image reading operation when the prescribed factor is removed.

2. The image forming apparatus according to claim 1, wherein said prescribed factor is such that either said image reading unit or said image forming unit are unable to operate.

3. The image forming apparatus of claim 1, further comprising an interruption unit which interrupts the image reading operation of said image reading unit and the image forming operation of said image forming unit, and executes an image reading operation and an image forming operation for a third group of original documents, wherein the interruption by said interruption unit is said prescribed factor.

4. The image forming apparatus of claim 1, wherein said control unit maintains a state in which the image forming operation of said image forming unit is stopped, and, if the image reading operation and the image forming operation are for a same group of original documents, accepts a manual input for resuming operation when the prescribed factor is removed.

5. An image forming apparatus comprising:
    an image reading unit which performs an image reading operation that comprises reading images of original documents and producing image data corresponding thereto;
    a memory which stores the image data produced by said image reading unit;
    an image forming unit which performs an image forming operation that comprises reproducing said images based on the image data stored in said memory;
    a detection unit which detects if a prescribed factor arises; and
    a control unit which stops the image reading operation of said image reading unit and the image forming operation of said image forming unit when said detection unit detects said prescribed factor; and
    if the image reading operation is for a different group of said original documents than the image forming operation, said control unit controls such that the image forming operation of said image forming unit is automatically resumed and a manual input for resuming the image reading operation of said image reading unit is accepted when said prescribed factor is removed.

6. The image forming apparatus according to claim 5, further comprising an interface unit which receives image data from an external device, and supplies the image data received from the external device to said memory.

7. The image forming apparatus according to claim 6, wherein
    said interface unit transmits image data stored in said memory to an external device.

8. The image forming apparatus according to claim 5, wherein said control unit controls said image forming unit such that said image forming unit does not perform said image forming operation for the image data stored in said memory and is concerned with a group of original documents for which reading by said image reading unit is executed when the operation of said image reading unit is stopped.

9. The image forming apparatus according to claim 5, further comprising an interruption unit which interrupts the image reading operation of said image reading unit and the image forming operation of said image forming unit, and executes an image reading operation and an image forming operation for a group of original documents that is different than a group of original documents from before the interruption, wherein the interruption by said interruption unit is said prescribed factor.

10. The image forming apparatus according to claim 9, wherein said control unit cancels the interrupt after no image forming operation is performed for a prescribed time after the operations are interrupted by said interruption unit.

11. The image forming apparatus according to claim 10, wherein, if the interrupted image reading operation of said image reading unit and the interrupted image forming operation of said image forming unit are for a same group of original documents, then said control unit maintains the interruption after the prescribed time passes.

* * * * *